(12) United States Patent
He et al.

(10) Patent No.: US 10,938,912 B2
(45) Date of Patent: Mar. 2, 2021

(54) SWEEPER, SERVER, SWEEPER CONTROL METHOD AND SWEEPER CONTROL SYSTEM

(71) Applicant: JIANGSU MIDEA CLEANING APPLIANCES CO., LTD., Suzhou (CN)

(72) Inventors: Bo He, Suzhou (CN); Zexuan Fan, Suzhou (CN)

(*) Notice: Subject to any disclaimer, the term of this patent is extended or adjusted under 35 U.S.C. 154(b) by 0 days.

(21) Appl. No.: 16/719,769

(22) Filed: Dec. 18, 2019

(65) Prior Publication Data
US 2020/0204629 A1 Jun. 25, 2020

(30) Foreign Application Priority Data

Dec. 24, 2018 (CN) .......................... 201811584997.4

(51) Int. Cl.
*H04L 29/08* (2006.01)
*A47L 11/24* (2006.01)
*A47L 11/28* (2006.01)
*A47L 11/40* (2006.01)
*G05B 13/02* (2006.01)

(52) U.S. Cl.
CPC ............ *H04L 67/125* (2013.01); *A47L 11/24* (2013.01); *A47L 11/28* (2013.01); *A47L 11/4011* (2013.01); *A47L 11/4061* (2013.01); *A47L 11/4066* (2013.01); *G05B 13/0265* (2013.01); *A47L 2201/04* (2013.01); *A47L 2201/06* (2013.01)

(58) Field of Classification Search
CPC ........ H04L 67/125; A47L 11/24; A47L 11/28; A47L 11/4011; A47L 11/4061; A47L 11/4066; G05B 13/0265
See application file for complete search history.

(56) References Cited

U.S. PATENT DOCUMENTS

| 2018/0304461 | A1  | 10/2018 | Shaw |
| 2019/0208979 | A1* | 7/2019 | Bassa ................. G06K 9/00664 |
| 2020/0012292 | A1* | 1/2020 | Park ..................... G05D 1/0253 |
| 2020/0029774 | A1* | 1/2020 | Mellinger, III ..... A47L 11/4061 |
| 2020/0094398 | A1* | 3/2020 | Young ................... B25J 11/008 |

FOREIGN PATENT DOCUMENTS

CN 105241461 A 1/2016

OTHER PUBLICATIONS

European Search Report of 19217340.9.

* cited by examiner

*Primary Examiner* — Ernest G Tacsik
(74) *Attorney, Agent, or Firm* — Kilpatrick Townsend & Stockton, LLP

(57) ABSTRACT

A sweeper, a server, a sweeper control method and a sweeper control system are disclosed by the present application, which belong to the technical field of smart home. The sweeper has: a main control module, and a detection module, a 5G communication module, a movement module and a cleaning module each connected to the main control module; wherein the main control module sends indoor data detected by the detection module to a server through the 5G communication module, and controls at least one of the movement module and the cleaning module according to a first instruction returned from the server. The sweeper of the present disclosure is capable of directly communicating with the server through the 5G network. On one hand, a large amount of complicated calculation may be performed in the server; on the other hand, the problem of inaccurate control of the sweeper is effectively avoided.

15 Claims, 4 Drawing Sheets

SWEEPER, SERVER, SWEEPER CONTROL METHOD AND SWEEPER CONTROL SYSTEM

CROSS-REFERENCES TO RELATED APPLICATIONS

The present application claims priority to Chinese Patent Application No. 201811584997.4, entitled "Sweeper, Server, Sweeper Control Method and Sweeper Control System", and filed on Dec. 24, 2018, which is incorporated herein by reference in its entirety.

FIELD

The present disclosure relates to the field of smart home, and in particular to a sweeper, a server, a sweeper control method and a sweeper control system.

BACKGROUND

With the rapid development of scientific and technological levels, various smart devices have emerged as the time requires, and a sweeper is one of the most popular smart devices. Since current sweepers require more complicated calculation such as ground material detection and obstacle detection during operation, they are typically integrated therein with a plurality of processors, making the cost and manufacturing process more difficult. Moreover, current sweepers communicate with the outside mainly based on a 3G network, a 4G network and the like, and have the problems of low communication speed, poor anti-interference, high delay, etc., thus resulting in the occurrence of inaccurate control of the sweepers from time to time.

SUMMARY

In one embodiment, a sweeper is provided by a first aspect of the present disclosure, which includes: a main control module, and a detection module, a 5G communication module, a movement module and a cleaning module each connected to the main control module;

wherein the main control module sends indoor data detected by the detection module to a server through the 5G communication module, and controls at least one of the movement module and the cleaning module according to a first instruction returned from the server.

The sweeper of the present disclosure is capable of directly communicating with the server through the 5G network. On one hand, a large amount of complicated calculation may be performed in the server, so that the sweeper does not need to be integrated therein with a plurality of processors, to reduce the manufacturing cost and the difficulty in the manufacturing process of the sweeper; on the other hand, the problem of inaccurate control of the sweeper caused by low network speed, poor anti-interference and high delay in existing technologies is effectively avoided.

In one embodiment, the main control module is further configured to receive, by the 5G communication module, a second instruction sent by the server, and control at least one of the detection module, the movement module and the cleaning module according to the second instruction.

In one embodiment, the sweeper further includes an artificial intelligence module;

The artificial intelligence module is connected to the main control module, and is configured to acquire at least one information of user limb information, user voice information and indoor environment information through a 5G network, and analyze the at least one information to obtain an analysis result;

correspondingly, the main control module is configured to control at least one of the movement module and the cleaning module according to the analysis result.

In one embodiment, the sweeper further includes an artificial intelligence module;

and the artificial intelligence module is connected to the detection module and the main control module respectively, and is configured to generate a third instruction according to at least one information of user limb information, user voice information and indoor environment information in the indoor data; and the main control module is configured to control at least one of the movement module and the cleaning module according to the third instruction.

In one embodiment, the sweeper further includes an additional communication module;

wherein the additional communication module is connected to the main control module, and the sweeper communicates with a terminal device through the additional communication module.

In one embodiment, the additional communication module includes at least one of a WIFI module, a Bluetooth module and a ZigBee module.

In one embodiment, the sweeper further includes a power module;

wherein the power module is connected to each of the modules of the sweeper for supplying power to each of the modules.

In one embodiment, a method for controlling a sweeper is provided, which includes:

detecting indoor data;

sending the indoor data to a server through a 5G network;

receiving, through the 5G network, a first instruction returned from the server; and adjusting a working state according to the first instruction.

In one embodiment, the method further includes:

receiving, through the 5G network, a second instruction sent by the server, wherein the second instruction is based on a control request of a terminal device; and performing a corresponding operation according to the second instruction.

In one embodiment, the method further includes:

analyzing at least one information of detected user limb information, user voice information and indoor environment information to obtain an analysis result; and performing a corresponding operation according to the analysis result.

One embodiment describes, a method for controlling a sweeper, which includes:

receiving, through a 5G network, indoor data sent by a sweeper;

analyzing the indoor data and generating a first instruction; and sending the first instruction to the sweeper through the 5G network.

In one embodiment, the method further includes:

receiving a control request sent by a terminal device; and sending a corresponding second instruction to the sweeper through the 5G network.

In one embodiment, the method further includes:

sending state information of the sweeper to the terminal device.

One embodiment provides a server, which includes:
a processor; and
a memory;
wherein the memory has a sweeper control program stored thereon, and when the sweeper control program is executed by the processor, the method according to the third aspect of the present disclosure is implemented.

In one embodiment, a system for controlling a sweeper is provided by a fifth aspect of the present disclosure, which includes: a sweeper, a server, and a terminal device;
wherein the server is connected to the sweeper and the terminal device respectively, and communicates with the sweeper through a 5G network;
the sweeper is the sweeper according to the first aspect of the present disclosure; and
the server is the server according to the fourth aspect of the present disclosure.

In one embodiment, a computer readable storage medium is provided, and the computer readable storage medium has a sweeper control program stored thereon, and when the sweeper control program is executed by a processor, the method according to any of the second aspect and the third aspect of the present disclosure is implemented.

BRIEF DESCRIPTION OF THE DRAWINGS

The following drawings are illustrative of embodiments of the present disclosure.

DETAILED DESCRIPTION OF THE DISCLOSURE

Figure 1:
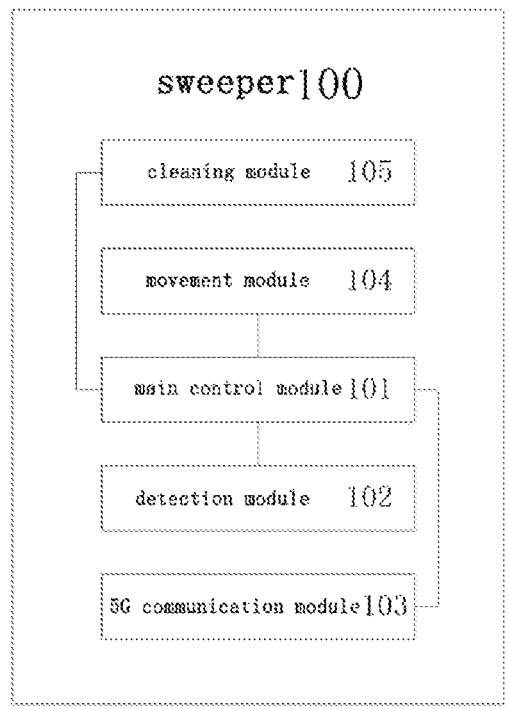
FIG. 1 is a schematic structural view of a sweeper according to an embodiment of the present disclosure.

Exemplary embodiments of the present disclosure are described in detail below with reference to the drawings. Although the exemplary embodiments of the present disclosure are shown in the drawings, it should be understood that the present disclosure can be implemented in various forms and should not be limited to the embodiments set forth herein.

Embodiments of the present application are mainly directed to the following problems in the existing technologies: current sweepers require more complicated calculation during operation, and therefore they are typically integrated therein with a plurality of processors, making the cost and manufacturing process more difficult; moreover, current sweepers communicate with the outside mainly based on a 3G network, a 4G network and the like, and have the problems of low communication speed, poor anti-interference, high delay, etc., thus resulting in the occurrence of inaccurate control of the sweepers from time to time.

Considering that the 5G communication technology has the characteristics of high speed, low delay, high reliability, low power consumption, etc., embodiments of the present application provide a sweeper in which a 5G communication module is integrated so that the sweeper can perform a high-speed communication with a server directly through a 5G network. On one hand, a large amount of complicated calculation may be performed in the server, so that the sweeper does not need to be integrated therein with a plurality of processors, to reduce the manufacturing cost and the difficulty in the manufacturing process of the sweeper; on the other hand, the problem of inaccurate control of the sweeper caused by low network speed, poor anti-interference and high delay in existing technologies is effectively avoided.

The sweeper, server, sweeper control method and sweeper control system of the present application will be described below with reference to the accompanying drawings.

FIG. 1 is a schematic structural view of a sweeper according to an embodiment of the present disclosure; as shown in FIG. 1, the sweeper 100 includes: a main control module 101, a detection module 102, a 5G communication module 103, a movement module 104, and a cleaning module 105; wherein the main control module 101 is connected to the detection module 102, the 5G communication module 103, the movement module 104 and the cleaning module 105 respectively.

The main control module 101 sends indoor data detected by the detection module 102 to a server through the 5G communication module 103, and controls at least one of the movement module 104 and the cleaning module 105 according to a first instruction returned from the server.

In one embodiment, after the sweeper is powered on and enters the working state, the detection module 102 acquires indoor data, such as ground image and indoor layout image in a traveling direction of the sweeper; the main control module 101 sends the indoor data acquired by the detection module 102 to the server through the 5G communication module 103 so that the server can perform a calculation and analysis on the indoor data; at the same time, the main control module 101 receives a first instruction sent by the server through the 5G communication module 103, wherein the first instruction may be an analysis result of the server, or may be an instructive command generated by the server according to the analysis result; for example, the first instruction is ground material information, traveling direction changing instruction, etc.; correspondingly, the main control module 101 controls a driving force for traveling of the movement module 104 and a cleaning mode of the cleaning module according to the ground material information, and controls the movement module 104 to change a movement direction according to the traveling direction changing instruction, etc.

In the present disclosure, by integrating the 5G communication module in the sweeper, the sweeper is capable of directly communicating with the server through the 5G network. On one hand, a large amount of complicated calculation may be performed in the server, so that the sweeper does not need to be integrated therein with a plurality of processors, to reduce the manufacturing cost and the difficulty in the manufacturing process of the sweeper;

on the other hand, the problem of inaccurate control of the sweeper caused by low network speed, poor anti-interference and high latency in existing technologies is effectively avoided.

Considering that a lot of controlling and displaying of the sweeper need to be carried out in a terminal device, whereas in the existing technologies, the communication module of the sweeper is mainly a wireless WIFI module or a Bluetooth module, which has a low communication speed and poor anti-interference, making the reception and transmission of some control information or display information often have a delay, and resulting in the occurrence of the user's inaccurate control of the sweeper from time to time.

In this regard, in another embodiment of the present application, the main control module 101 is further configured to receive, by the 5G communication module 103, a second instruction sent by the server, and control at least one of the detection module 102, the movement module 104 and the cleaning module 105 according to the second instruction; wherein the second instruction is based on a control request of the terminal device.

For example, when the user needs to control the sweeper for cleaning, a sweeper startup request is sent to the server through the terminal device, and the server sends a corresponding startup instruction to the sweeper 100 through the 5G network; the main control module 101 of the sweeper 100 receives the startup instruction through the 5G communication module 103, controls the detection module 102 to detect the indoor data, controls the movement module 104 to enter a moving state, and controls the cleaning module 105 to perform a cleaning operation.

In this embodiment, the terminal device controls the sweeper based on the 5G network through the server, which effectively avoids the problem that the receiving and transmitting of the control information and the display information have delay caused by low network speed, poor anti-interference and the like in the existing technologies, and increases the accuracy of sweeper control.

In another embodiment of the present application, the main control module 101 is further configured to receive, through the 5G communication module 103, a third instruction sent by the server, connect to the network according to the third instruction, and return a connection result to the server through the 5G communication module 103; wherein the third instruction is based on a networking request of the terminal device.

In one embodiment, when the user deploys a network to the sweeper 100, the user controls a network connection control in the terminal device to send a networking request to the server, and the server sends a third instruction to the sweeper 100 through the 5G network; the main control module 101 of the sweeper 100 receives the third instruction through the 5G communication module 103, connects to the corresponding network according to network information in the third instruction, and sends connection success information to the server through the 5G communication module 103 when the connection is successful; the server will send the received connection success information to the terminal device, and the terminal device displays that the network connection is successful. Therefore, based on the 5G network, the user only needs a one-step operation to complete the network deployment process of the sweeper, which greatly improves the network deployment efficiency and accuracy of the sweeper as compared to the existing solutions in which a lot of cumbersome operation steps are required for the user.

In another embodiment of the present application, the detection module 102 includes, but is not limited to, at least one of an ultrasonic sensor, an infrared sensor, a lidar sensor, a gyroscope, a camera, etc., to accurately acquire various indoor information.

In another embodiment of the present application, the movement module 104 is of a wheeled-type, including a drive wheel and a universal wheel, etc., wherein the number of the drive wheel and the universal wheel may be set as required in practical applications.

In another embodiment of the present application, the cleaning module 105 includes a roller brush, a fan, an air duct, a dust box, a water tank and the like to perform operations on the ground such as sweeping, mopping and the like.

Figure 2:
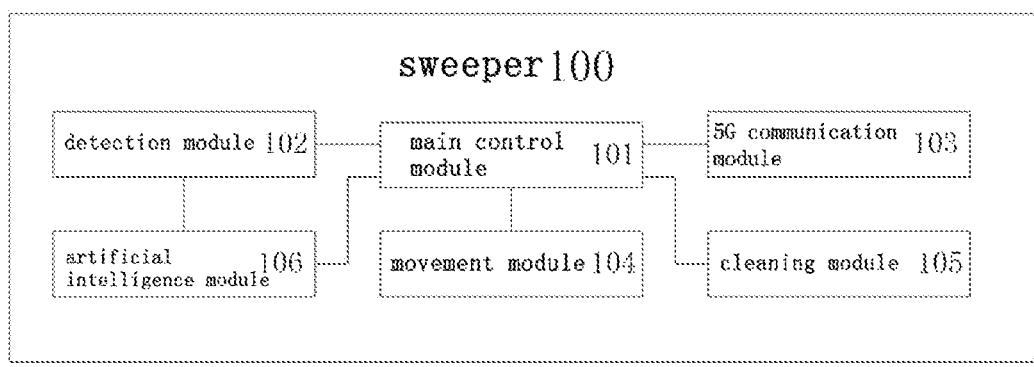
FIG. 2 is a schematic structural view of a sweeper according to another embodiment of the present disclosure.

In another embodiment of the present application, as shown in FIG. 2, the sweeper 100 further includes: an artificial intelligence module 106; wherein the artificial intelligence module 106 is connected to the main control module 101 for acquiring at least one information of user limb information, user voice information and indoor environment information through the 5G network, and analyzes the at least one information to obtain an analysis result;

correspondingly, the main control module 101 is further configured to control at least one of the movement module 104 and the cleaning module 105 according to the analysis result of the artificial intelligence module 106.

For example, the artificial intelligence module 106 acquires a gesture of the user and determines a to-be-cleaned area, and the main control module 101 controls the movement module 104 to move to a corresponding area according to the to-be-cleaned area determined by the artificial intelligence module 106; for example, if the artificial intelligence module 106 acquires information indicating that cooking is being conducted in a kitchen, a virtual wall will be generated at an entrance of the kitchen, and meanwhile the main control module 101 will control the movement module 104 to change the movement direction to prevent the sweeper from entering the kitchen.

Figure 3:
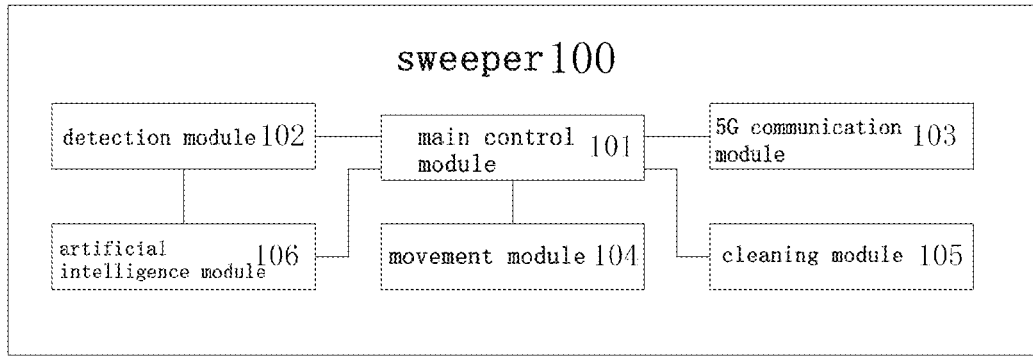
FIG. 3 is a schematic structural view of a sweeper according to another embodiment of the present disclosure.

In another embodiment of the present application, as shown in FIG. 3, the artificial intelligence module 106 may be further connected to the main control module 101 and the detection module 102 respectively, for analyzing at least one information of user limb information, user voice information and indoor environment information in the indoor data detected by the detection module 102 to obtain an analysis result;

correspondingly, the main control module 101 is configured to control at least one of the movement module 104 and the cleaning module 105 according to the analysis result.

It should be noted that the main control module 101 may also send at least one information of the user limb information, the user voice information and the indoor environment information detected by the detection module 102 to the server through the 5G communication module 103 so that the server performs an intelligent analysis.

Therefore, the sweeper in the present embodiment, based on the 5G network, implements functions such as augmented reality, virtual reality and Internet touching and sensing, and is more intelligent, which greatly improves the user experience during use.

Figure 4:
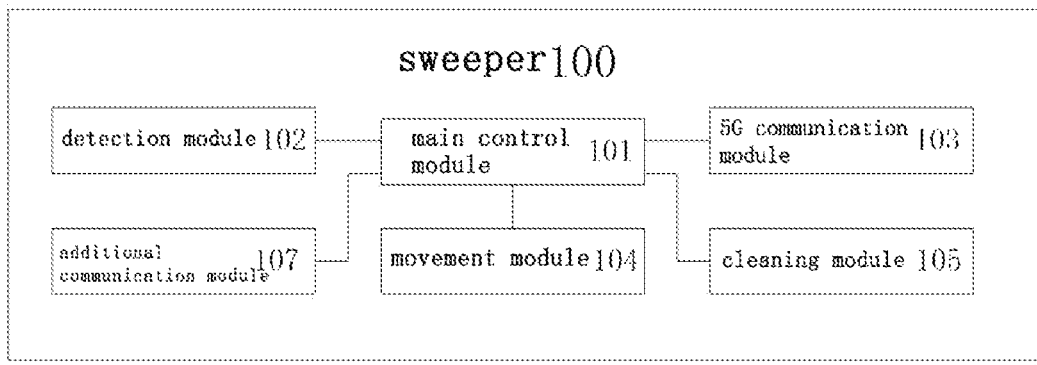
FIG. 4 is a schematic structural view of a sweeper according to another embodiment of the present disclosure.

In another embodiment of the present application, in view of the fact that the 5G network currently has not been popularized to each home, as shown in FIG. 4, the sweeper 100 further includes an additional communication module 107; wherein the additional communication module 107 is connected to the main control module 101, and is configured for the sweeper 100 to communicate with the terminal device.

In another embodiment of the present application, the additional communication module 107 includes at least one of a WIFI module, a Bluetooth module and a ZigBee (Zigbee Protocol) module so that the sweeper 100 is equally applicable in a non-5G network environment.

Figure 5:
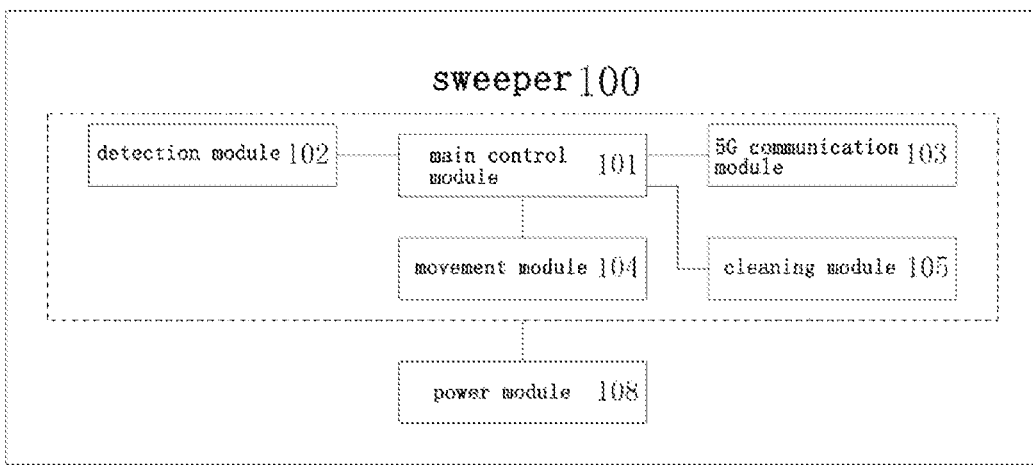
FIG. 5 is a schematic structural view of a sweeper according to another embodiment of the present disclosure.

In another embodiment of the present application, as shown in FIG. 5, the sweeper 100 further includes a power module 108. The power module 108 is connected to the main control module 101, the detection module 102, the movement module 104 and the cleaning module 105 to supply power to the main control module 101, the detection module 102, the movement module 104 and the cleaning module 105.

Figure 6:
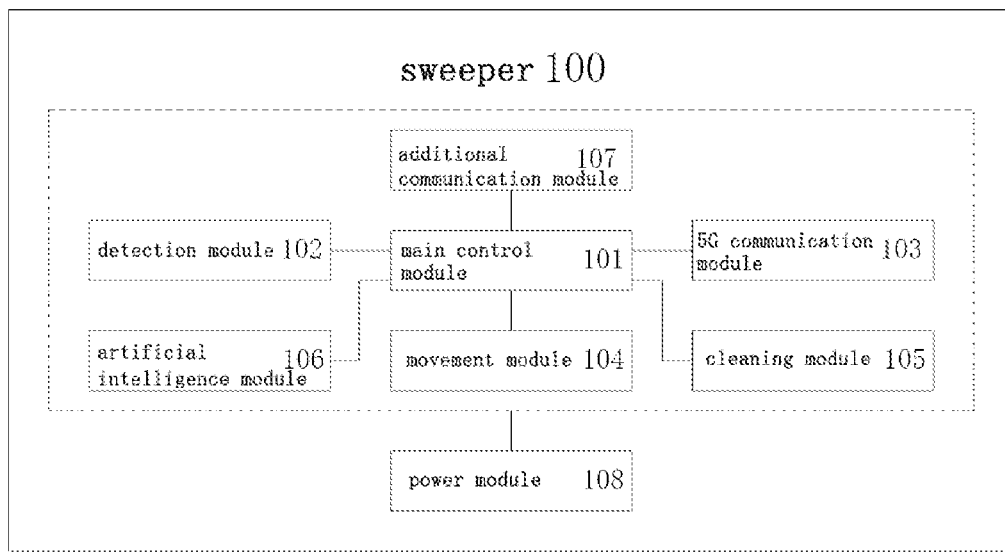
FIG. 6 is a schematic structural view of a sweeper according to another embodiment of the present disclosure.

In another embodiment of the present application, by using an example in which the artificial intelligence module 106 is only connected to the main control module 101, as shown in FIG. 6, the sweeper 100 may also include the artificial intelligence module 106, the additional communication module 107 and the power module 108 at the same time; wherein the power module 108 is connected to each of the modules of the sweeper to supply power to each of the modules.

FIGS. 1 to 6 do not pose any limitation on the sweeper, and the sweeper may include more or fewer components than illustrated, or may include combinations of components, or may include different arrangements of components.

Therefore, the sweeper of the present disclosure can perform high-speed communication with the server based on the 5G network. On one hand, a large amount of complicated calculation may be performed in the server, so that the sweeper does not need to be integrated therein with a plurality of processors, to reduce the manufacturing cost and the difficulty in the manufacturing process of the sweeper; on the other hand, the problem of inaccurate control of the sweeper caused by low network speed, poor anti-interference and high delay in existing technologies is effectively avoided. Further, based on the 5G network, the sweeper also implements the functions such as augmented reality and virtual reality, which is more intelligent and greatly improves the user experience during use. Finally, based on the 5G network, a one-key network deployment is realized, to eliminate various cumbersome operations during networking of current sweepers, and improving the efficiency and accuracy of the network deployment.

Figure 7:
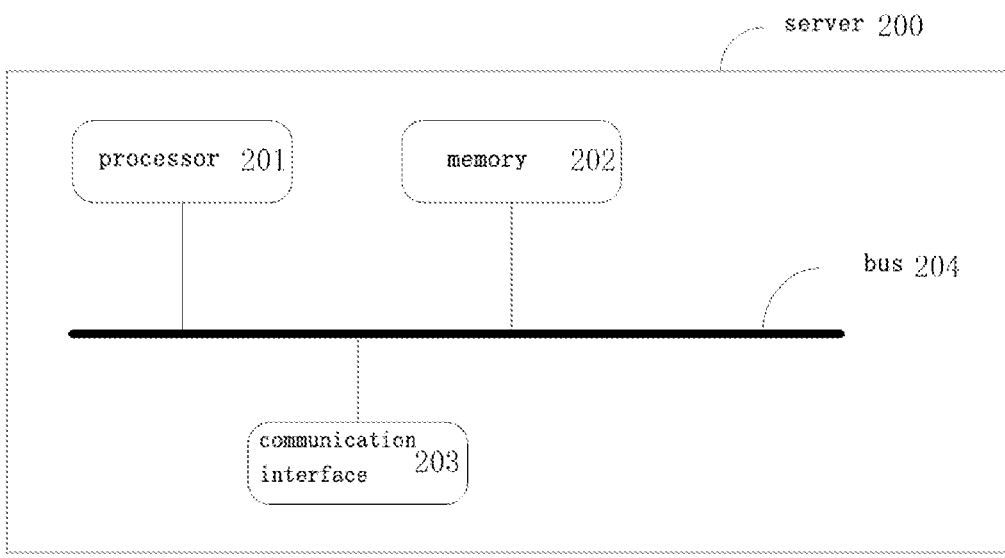
FIG. 7 is a schematic structural view of a server according to an embodiment of the present disclosure.

FIG. 7 is a schematic structural view of a server according to an embodiment of the present disclosure. The server may be a cloud server. As shown in FIG. 7, the server 200 includes: a processor 201, a memory 202, a communication interface 203, and a bus 204; wherein the processor 201, the memory 202 and the communication interface 203 are connected by the bus 204.

In some embodiments of the present disclosure, the processor 201 may be an integrated circuit chip with a signal processing capability; the processor 201 may also be a general-purpose processor, including a central processing unit (CPU), a network processor (NP), and the like; and the processor 1001 may also be a digital signal processor (DSP), an application specific integrated circuit (ASIC), and the like.

In some embodiments of the present disclosure, the memory 202 may include a high speed random access memory (RAM), and may also include a non-volatile memory such as a disk memory.

In some embodiments of the present disclosure, the communication interface 203 (which may be wired or wireless) implements communicative connection between system network elements and other network elements, and may employ a 5G network, an Internet, a wide area network, a local area network, a metropolitan area network, and the like.

In some embodiments of the present disclosure, the bus 204 may be an Industry Standard Architecture (ISA) bus, a Peripheral Component Interconnect (PCI) bus, or an Extended Industry Standard Architecture (EISA) bus, etc.

Embodiments of the present disclosure are illustrated in FIG. 7 and does not pose any limitation on the server, and the server may include more or fewer components than illustrated, or may include combinations of components, or may include different arrangements of components.

Further, the processor 201 calls a sweeper control program stored in the memory 202 to perform the following operations:

receiving, through a 5G network, indoor data sent by a sweeper;

analyzing the received indoor data and generating a first instruction; and sending the first instruction to the sweeper through the 5G network.

Further, the processor 201 may also call a sweeper control program stored in the memory 202 to perform the following operations:

receiving a control request sent by a terminal device; and sending a corresponding second instruction to the sweeper through the 5G network.

Further, the processor 201 may also call a sweeper control program stored in the memory 202 to perform the following operations:

sending state information of the sweeper to the terminal device.

Figure 8:
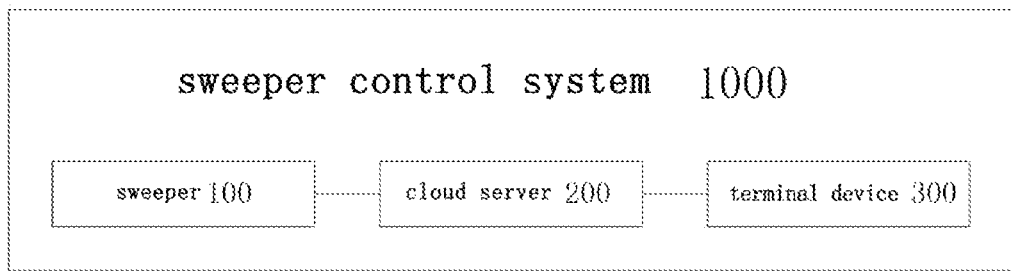
FIG. 8 is a schematic structural view of a sweeper control system according to an embodiment of the present disclosure.

Based on any of the above embodiments, an embodiment of the present disclosure further provides a sweeper control system. As shown in FIG. 8, the sweeper control system 1000 includes: a sweeper 100, a server 200, and a terminal device 300;

wherein the server 200 is connected to the sweeper 100 and the terminal device 300 respectively; the sweeper 100 is the sweeper described in any of the above embodiments; the server 200 is the server described in any of the above embodiments; further, the sweeper 100 and the server 200 communicate with each other through a 5G network, and the server 200 and the terminal device 300 may communicate with each other through a 5G network, or through a 3G network, a 4G network and the like.

In the sweeper control system of the present embodiment, the terminal device controls the sweeper through the server, and the server performs high-speed communication with the sweeper through the 5G network. On one hand, a large amount of complicated calculation may be performed in the server, so that the sweeper does not need to be integrated therein with a plurality of processors, to reduce the manufacturing cost and the difficulty in the manufacturing process of the sweeper; on the other hand, the problem of inaccurate control of the sweeper caused by low network speed, poor anti-interference and high delay in existing technologies is effectively avoided.

Based on the above hardware configuration, an embodiment of the sweeper control method of the present application is proposed.

Figure 9:
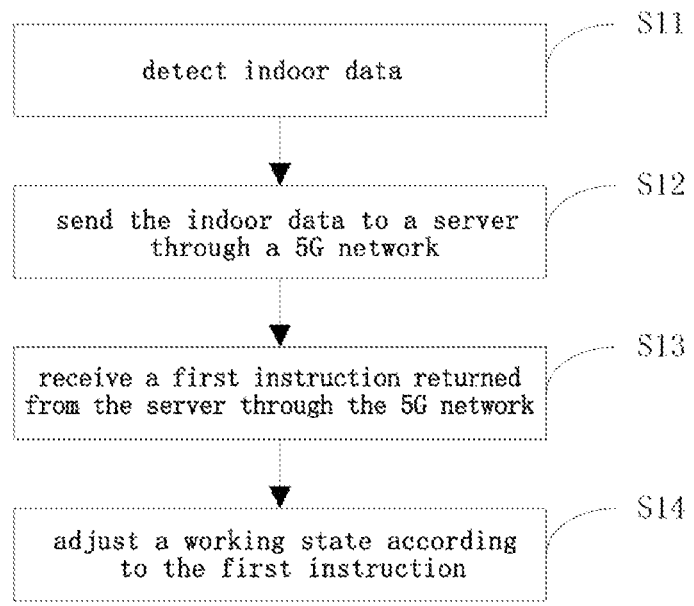
FIG. 9 is a schematic flow chart of a sweeper control method according to an embodiment of the present disclosure.

Referring to FIG. 9, a schematic flow chart of a sweeper control method according to an embodiment of the present disclosure is shown, wherein the control method may be applied to a sweeper, and the control method includes the following steps:

S11: detecting indoor data;

S12: sending the indoor data to a server through a 5G network;

S13: receiving, through the 5G network, a first instruction returned from the server; and S14: adjusting a working state according to the first instruction.

In one embodiment, after the sweeper is powered on and enters the working state, indoor data such as ground image and indoor layout image in a traveling direction are acquired, and are sent to the server through the 5G network, so that the server can analyze the ground material and whether an obstacle is about to be encountered in the traveling direction, and the like; at the same time, the sweeper receives a first instruction returned from the server through the 5G network, wherein the first instruction may be an analysis result of the server, or may be an instructive command generated by the server according to the analysis result; the sweeper adjusts the working state according to the first instruction; for example, if the first instruction indicates that the ground material information is soft ground, then the driving force for traveling is increased for the sweeper, and the cleaning mode is adjusted to strong cleaning.

In this embodiment, the sweeper is capable of directly communicating with the server through the 5G network. On one hand, a large amount of complicated calculation may be performed in the server, so that the sweeper does not need to be integrated therein with a plurality of processors, to reduce the manufacturing cost and the difficulty in the manufacturing process of the sweeper; on the other hand, the data transmission speed is fast, the network anti-interference is strong, and the delay is low, which improves the timeliness and accuracy of sweeper control.

In some embodiments of the present application, the method further includes:

A1: receiving, by the 5G network, a second instruction sent by the server, wherein the second instruction is based on a control request of the terminal device; and A2: performing a corresponding operation according to the second instruction.

In this embodiment, the user may also control the sweeper through the terminal device. In one embodiment, the user sends a control request to the server through the terminal device, and the server sends a corresponding second instruction to the sweeper through the 5G network according to the control request. The sweeper performs a corresponding operation according to the second instruction. Therefore, since the sweeper is controlled by the server based on the 5G network, the problem of inaccurate control of the sweeper caused by low network speed, poor anti-interference and high delay in existing technologies is effectively avoided.

In some embodiments of the present application, the method further includes:

B1: analyzing at least one information of detected user limb information, user voice information and indoor environment information to obtain an analysis result; and B2: performing a corresponding operation according to the analysis result.

The at least one information of user limb information, user voice information and indoor environment information may be detected by the sweeper through its own detection module, or may also be detected by the sweeper through its own artificial intelligence module; further, the limb information includes gestures, facial expressions and the like.

The sweeper in the present embodiment, based on the 5G network, implements functions such as augmented reality and virtual reality, and is more intelligent, which greatly improves the user experience during use.

Figure 10:
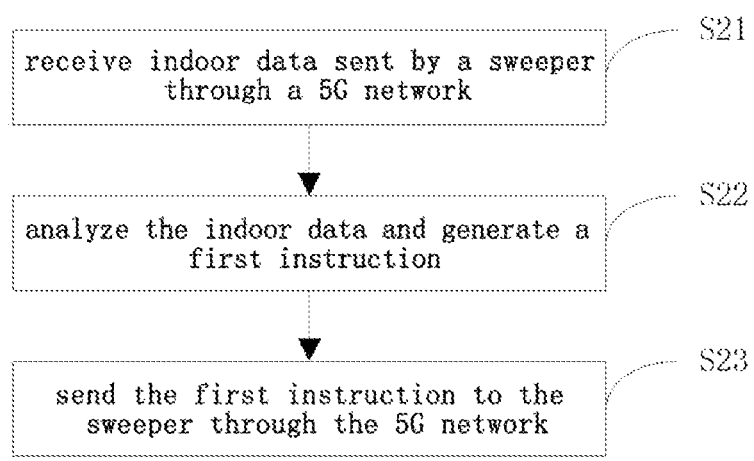
FIG. 10 is a schematic flow chart of a sweeper control method according to another embodiment of the present disclosure.

FIG. 10 is a schematic flow chart of a sweeper control method according to another embodiment of the present disclosure, wherein the control method may be applied to a server and includes the following steps:

S21: receiving, through a 5G network, indoor data sent by a sweeper;

S22: analyzing the indoor data and generating a first instruction; and

S23: sending the first instruction to the sweeper through the 5G network.

In one embodiment, the server receives, through the 5G network, indoor data such as ground image and indoor layout image in the traveling direction sent by the sweeper, analyzes the received indoor data to obtain an analysis result, and take the analysis result as a first instruction, or generate a first instruction based on the analysis result. Then, the first instruction is sent to the sweeper by the server so that the sweeper may adjust the working mode. For example, the first instruction is ground material information, and the sweeper adjusts a driving force for traveling, a cleaning mode and the like according to the first instruction.

In this embodiment, the indoor data may also include at least one information of user limb information, user voice information and indoor environment information to implement functions such as augmented reality and virtual reality based on the 5G network.

Therefore, based on the 5G network, a lot of processes such as image processing and calculation may be performed in the server, so that the sweeper does not need to be integrated therein with a plurality of processors, to reduce the manufacturing cost and the difficulty in the manufacturing process of the sweeper; on the other hand, based on the 5G network, the data transmission speed is fast, the network anti-interference is strong, and the delay is low, which improves the effectiveness and accuracy of the sweeper control.

In some embodiments of the present application, the method further includes:

C1: receiving a control request sent by a terminal device; and

C2: sending a corresponding second instruction to the sweeper through the 5G network.

In the present embodiment, the terminal device controls the sweeper through the server based on the 5G network, so that the problem of inaccurate control of the sweeper caused by low network speed, poor anti-interference and high delay in existing technologies is effectively avoided.

In some embodiments of the present application, the method further includes:

sending state information of the sweeper to the terminal device so that the state information of the sweeper is displayed to the user for facilitating the user in controlling the sweeper. For example, information such as a cleaning map and the current cleaning mode of the sweeper is sent to the terminal device.

In addition, a computer readable storage medium is further provided by an embodiment of the present disclosure, wherein the computer readable storage medium has a sweeper control program stored thereon, and when the sweeper control program is executed by a processor, any of the above sweeper control methods applicable to a sweeper is implemented.

A computer readable storage medium is further provided by another embodiment of the present disclosure, wherein the computer readable storage medium has a sweeper control program stored thereon, and when the sweeper control program is executed by a processor, any of the above sweeper control methods applicable to a server is implemented.

In the present disclosure, by disposing a 5G communication module in the sweeper, the sweeper can communicate with the server directly through the 5G network. On one hand, a large amount of complicated calculation may be performed in the server, so that the sweeper does not need to be integrated therein with a plurality of processors, to reduce the manufacturing cost and the difficulty in the manufacturing process of the sweeper; on the other hand, the problem of inaccurate control of the sweeper caused by low network speed, poor anti-interference and high delay in existing technologies is effectively avoided. Further, the intelligence function of the sweeper is expanded, and the intelligence degree and user experience during use are improved. Finally, based on the 5G network, a one-key network deployment is realized, to eliminate various cumbersome operations during networking of current sweepers, and improving the accuracy of the network deployment.

It is to be understood that the terms "comprise", "include", or any other variants thereof, are intended to encompass a non-exclusive inclusion, therefore a process, method, article, or system that include a series of elements not only include these elements, but also include other elements that are not explicitly listed, or elements that are inherent to such a process, method, article, or system. An element defined by the phrase "comprising a . . . " without further limitation does not exclude the presence of additional identical elements in the process, method, article, or system that includes the element.

The computer software product is stored in a storage medium as described above (such as a ROM/RAM, a magnetic disk, and an optical disk), including a number of instructions for causing a terminal device (which may be a mobile phone, a computer, a server, or a network device, etc.) to perform the methods described in various embodiments of the present disclosure.

What is claimed is:

1. A sweeper, comprising:
   a main control device;
   a detection device, a 5G communication device, an additional communication device, a movement device, an artificial intelligence device, and a cleaning device, each in communication with the main control device;
   wherein the main control device is configured to send indoor data detected by the detection device to a server through the 5G communication device, and control at least one of the movement device and the cleaning device according to a first instruction returned from the server;
   wherein the detection device is further configured to detect at least one of user limb movement and user voice command;
   wherein the artificial intelligence device is connected to the detection device and configured to analyze the at least one of user limb movement and user voice command to obtain an analysis result;
   wherein the additional communication device is configured to wirelessly communicate with a terminal device, and receive a third instruction from the terminal device;
   wherein the main control device is configured to control at least one of the movement device and the cleaning device according to the analysis result and the third instruction.

2. The sweeper according to claim 1,
   wherein the main control device is further configured to receive, by the 5G communication device, a second instruction sent by the server, and control at least one of
   the detection device,
   the movement device, and
   the cleaning device,
   according to the second instruction, and
   wherein the second instruction is based on a control request of the terminal device.

3. The sweeper according to claim 1, wherein the additional communication device is further configured to send state information of the sweeper to the terminal device.

4. The sweeper according to claim 1, wherein the additional communication device comprises at least one of a WIFI device, a Bluetooth device and a ZigBee device.

5. The sweeper according to claim 1, further comprising a power device;
   wherein the power device is connected to each of the devices of the sweeper for supplying power to each of the devices.

6. A method for controlling a sweeper at end of the sweeper, comprising:
   detecting indoor data;
   sending the indoor data to a server through a 5G communication device;
   receiving, through the 5G communication device, a first instruction returned from the server based on the indoor data; and
   adjusting a working state of the sweeper according to the first instruction;
   wherein the method further comprising:
   detecting at least one of user limb movement and user voice command;
   analyzing the at least one of user limb movement and user voice command to obtain an analysis result;
   receiving a third instruction from a terminal device through an additional communication device; and
   adjusting the working state according to the analysis result and the third instruction.

7. The method according to claim 6, further comprising:
   receiving, through the 5G network, a second instruction sent by the server, wherein the second instruction is based on a control request of the terminal device; and
   performing a corresponding operation according to the second instruction.

8. A method for controlling a sweeper at end of a server, comprising:
   receiving, through a 5G network, indoor data sent by the sweeper;
   analyzing the indoor data and generating a first instruction based on the indoor data; and
   sending the first instruction to the sweeper through the 5G network;
   wherein the method further comprising:
   detecting, by the sweeper, at least one of user limb movement and user voice command;
   analyzing the at least one of user limb movement and user voice command to obtain an analysis result;
   receiving, by the sweeper, a third instruction from a terminal device through an additional communication device provided in the sweeper; and adjusting a working state of the sweeper according to the first instruction, the third instruction and the analysis result.

9. The method according to claim 8, further comprising:
receiving a control request sent by the terminal device; and
sending a corresponding second instruction based on the control request to the sweeper through the 5G network.

10. The method according to claim 6, further comprising:
sending, by the additional communication device, state information of the sweeper to the terminal device.

11. The method according to claim 8, further comprising:
sending, by the additional communication device, state information of the sweeper to the terminal device.

12. A server, comprising:
a processor; and
a memory;
wherein the memory has a sweeper control program stored thereon, and when the sweeper control program is executed by the processor to execute, a method for controlling a sweeper, the method comprising:
receiving, through a 5G network, indoor data sent by the sweeper;
analyzing the indoor data and generating a first instruction based on the indoor data; and
sending the first instruction to the sweeper through the 5G network;
wherein the method further comprising:
detecting, by the sweeper, at least one of user limb movement and user voice command;
analyzing the at least one of user limb movement and user voice command to obtain an analysis result;
receiving, by the sweeper, a third instruction from a terminal device through an additional communication device provided in the sweeper; and
adjusting a working state of the sweeper according to the first instruction, the third instruction and the analysis result.

13. A system for controlling a sweeper, comprising:
a sweeper, a server, and a terminal device;
wherein the server is connected to the sweeper and the terminal device respectively, and communicates with the sweeper and the terminal device through a 5G network;
the sweeper is the sweeper according to claim 1; and
the server is the server according to claim 12.

14. A non-transitory computer readable storage medium, wherein the computer readable storage medium has a sweeper control program stored thereon, and when the sweeper control program is executed by a processor, a method for controlling a sweeper at end of the sweeper is performed, the method comprising:
detecting indoor data;
sending the indoor data to a server through a 5G communication device;
receiving, through the 5G communication device, a first instruction returned from the server based on the indoor data; and
adjusting a working state of the sweeper according to the first instruction;
wherein the method further comprising:
detecting at least one of user limb movement and user voice command;
analyzing the at least one of user limb movement and user voice command to obtain an analysis result;
receiving a third instruction from a terminal device through an additional communication device; and
adjusting the working state according to the analysis result and the third instruction.

15. A non-transitory computer readable storage medium, wherein the computer readable storage medium has a sweeper control program stored thereon, and when the sweeper control program is executed by a processor, a method for controlling a sweeper at end of a server is performed, the method comprising:
receiving, through a 5G network, indoor data sent by the sweeper;
analyzing the indoor data and generating a first instruction based on the indoor data; and
sending the first instruction to the sweeper through the 5G network;
wherein the method further comprising:
detecting, by the sweeper, at least one of user limb movement and user voice command;
analyzing the at least one of user limb movement and user voice command to obtain an analysis result;
receiving, by the sweeper, a third instruction from a terminal device through an additional communication device provided in the sweeper; and
adjusting a working state of the sweeper according to the first instruction, the third instruction and the analysis result.

* * * * *